United States Patent [19]

Stradnick

[11] Patent Number: 5,179,754
[45] Date of Patent: Jan. 19, 1993

[54] ICE SCRAPER APPARATUS

[76] Inventor: Loran J. Stradnick, R.D. #2, Box 180-B, Wapwallopen, Pa. 18660

[21] Appl. No.: 826,050

[22] Filed: Jan. 27, 1992

[51] Int. Cl.⁵ ............................................. A47L 13/02
[52] U.S. Cl. ................................. 15/105; 15/236.01; 15/236.02; 15/236.07; 362/109
[58] Field of Search ............... 15/236.02, 236.07, 105; 362/197, 199, 109, 119, 120

[56] References Cited

U.S. PATENT DOCUMENTS

| 1,280,370 | 10/1918 | Beckmann | 362/199 |
| 2,373,131 | 4/1945 | Mann | 362/197 |
| 2,544,056 | 3/1951 | Wickwire | 362/197 |
| 2,778,043 | 1/1957 | Arf | 362/119 |
| 4,719,660 | 1/1988 | Hopkins | 15/236.02 |
| 4,770,712 | 9/1988 | Hopkins | 15/236.02 |
| 5,101,529 | 4/1992 | Tippie | 15/236.02 |

Primary Examiner—Harvey C. Hornsby
Assistant Examiner—Randall Edward Chin
Attorney, Agent, or Firm—Leon Gilden

[57] ABSTRACT

A cup member is arranged for scraping accumulated ice from a vehicular windshield, including a cylindrical body formed with a conical lower skirt projecting exteriorly of the cylindrical body and formed with a planar top wall, including securement apparatus mounted thereto. The securement apparatus may include an apertured flanged securement plate or alternatively, a handle member mounted thereto. The handle member may be further configured to include illumination means to provide illumination during conditions of limited available light for use by individuals in predawn hours.

1 Claim, 4 Drawing Sheets

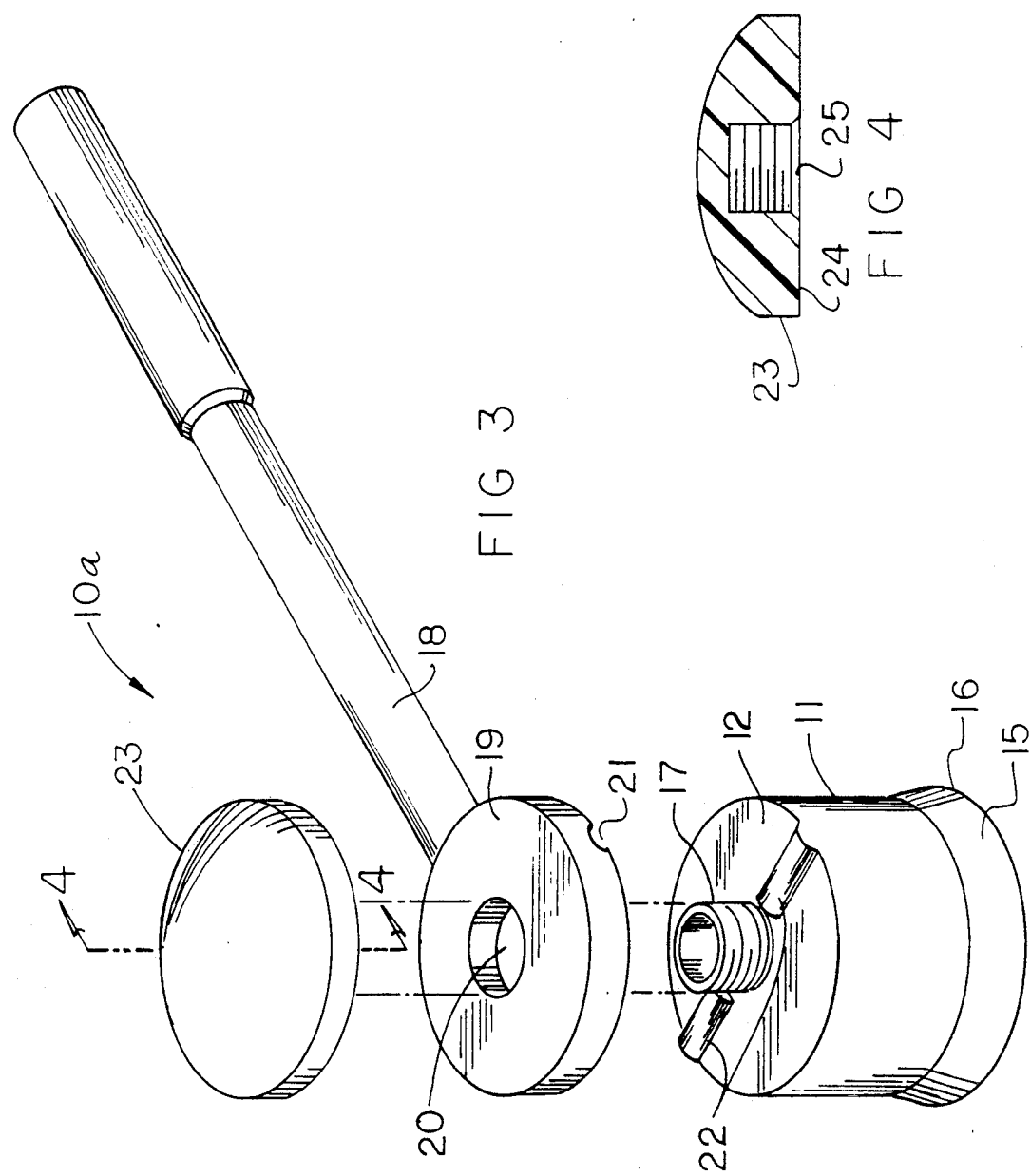

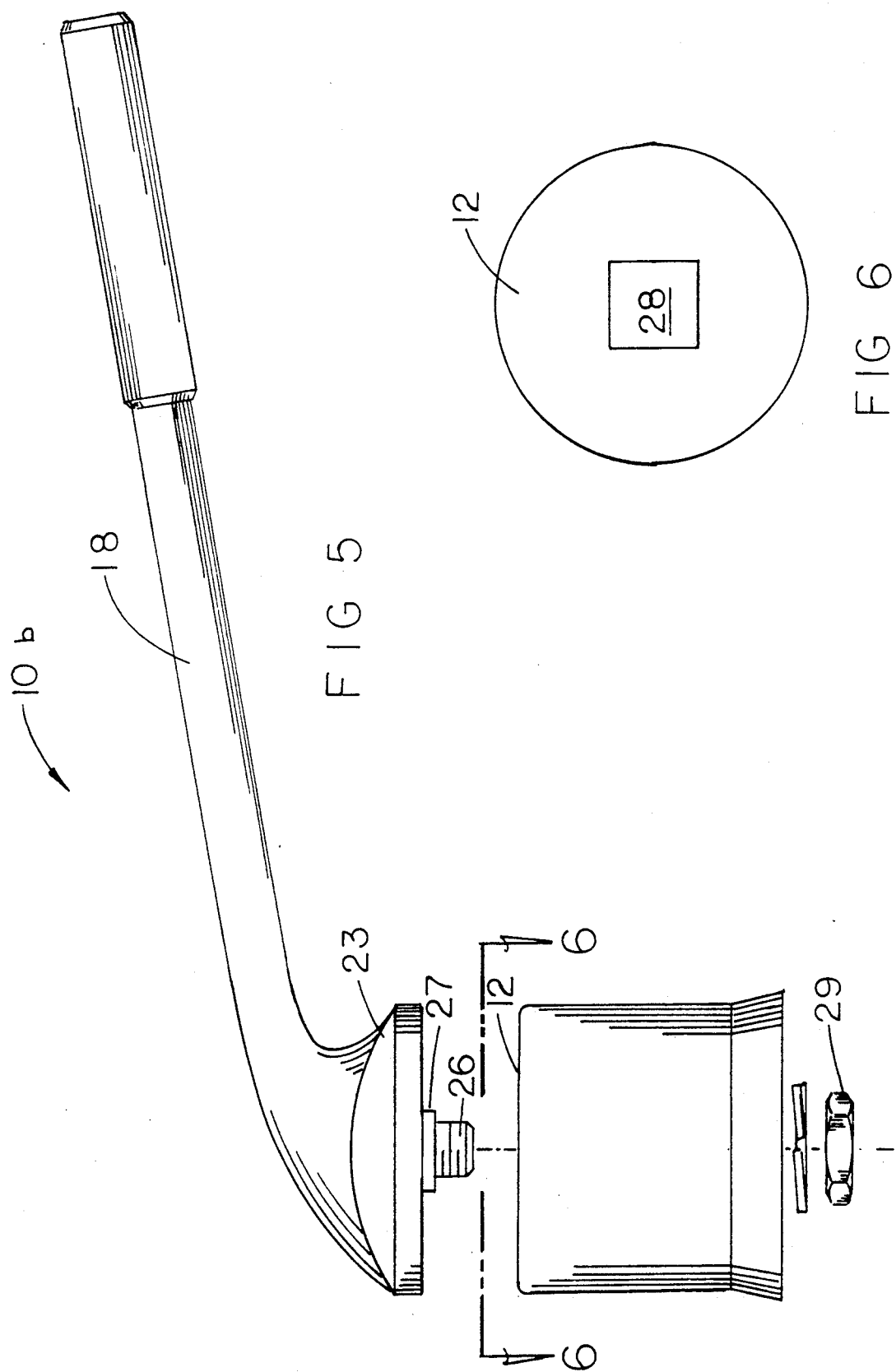

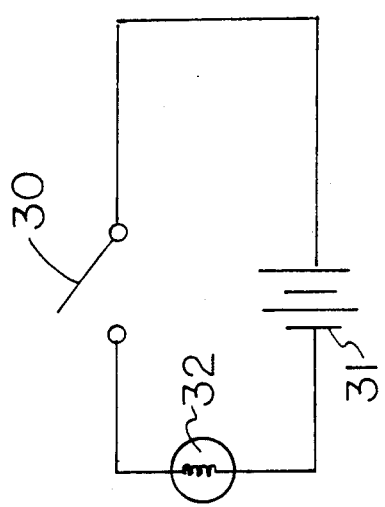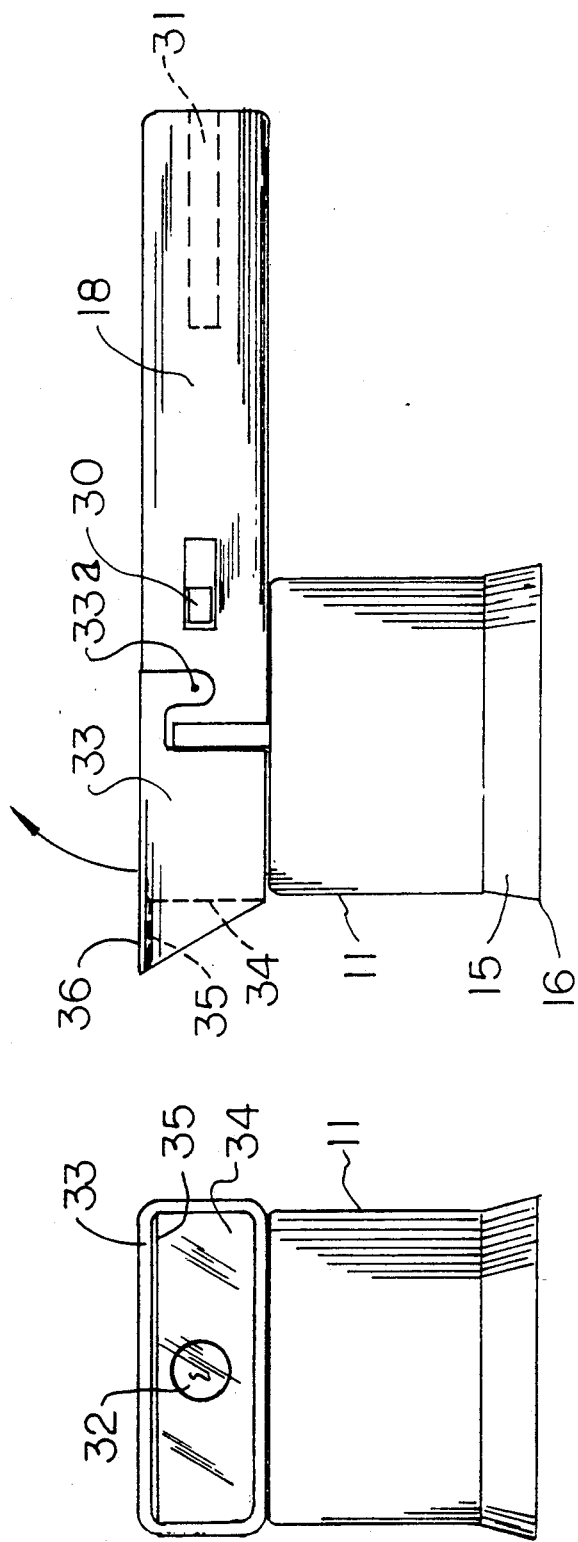

ICE SCRAPER APPARATUS

BACKGROUND OF THE INVENTION

1. Field of the Invention

The field of invention relates to ice scraping apparatus, and more particularly pertains to a new and improved ice scraper apparatus wherein the same is configured as a hand tool to remove accumulated ice relative to a vehicular windshield.

2. Description of the Prior Art

Various manually manipulatable ice scraper tool structure has been set forth in the prior art and is exemplified in the U.S. Pat. No. 4,922,569 to Brinker, et al.; U.S. Pat. No. 4,747,175 to Durgin; U.S. Pat. No. 4,870,712 to Markus; and U.S. Pat. No. 4,719,660 to Hopkins. The various ice scraping tool structure of the prior art typically incorporates a rigid linear blade mounted across a windshield surface in contrast to the circularly configured blade structure of the instant invention arranged for grasping at its upper end for projecting across a vehicular windshield.

Accordingly, it may be appreciated that there continues to be a need for a new and improved ice scraper apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of ice scraper apparatus now present in the prior art, the present invention provides an ice scraper apparatus wherein the same is arranged for directing a circular blade across a vehicular windshield surface. As such, the general purpose of the present invention, which will be described subsequently in greater detail, is to provide a new and improved ice scraper apparatus which has all the advantages of the prior art ice scraper apparatus and none of the disadvantages.

To attain this, the present invention provides a cup member arranged for scraping accumulated ice from a vehicular windshield, including a cylindrical body formed with a conical lower skirt projecting exteriorly of the cylindrical body and formed with a planar top wall, including securement apparatus mounted thereto. The securement apparatus may include an apertured flange securement plate or alternatively, a handle member mounted thereto. The handle member may be further configured to include illumination means to provide illumination during conditions of limited available light for use by individuals in predawn hours.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved ice scraper apparatus which has all the advantages of the prior art ice scraper apparatus and none of the disadvantages.

It is another object of the present invention to provide a new and improved ice scraper apparatus which may be easily and efficiently manufactured and marketed.

It is a further object of the present invention to provide a new and improved ice scraper apparatus which is of a durable and reliable construction.

An even further object of the present invention is to provide a new and improved ice scraper apparatus which is susceptible of a low cost of manufacture with regard to both materials and labor, and which accordingly is then susceptible of low prices of sale to the consuming public, thereby making such ice scraper apparatus economically available to the buying public.

Still yet another object of the present invention is to provide a new and improved ice scraper apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of a modification of the invention.

FIG. 4 is an orthographic view, taken along the lines 4—4 of FIG. 3 in the direction indicated by the arrows.

FIG. 5 is an orthographic side view in exploded illustration of a further modification of the invention.

FIG. 6 is an orthographic view, taken along the lines 6—6 of FIG. 5 in the direction indicated by the arrows.

FIG. 7 is an orthographic front view, taken in elevation, of a further modified apparatus.

FIG. 8 is an orthographic side view of the apparatus as set forth in FIG. 7.

FIG. 9 is a diagrammatic electrical illustration of circuitry employed by the invention, as set forth in the FIGS. 7 and 8, to effect illumination of an associated illumination bulb therewithin.

DESCRIPTION OF THE PREFERRED EMBODIMENT

Figure 1:
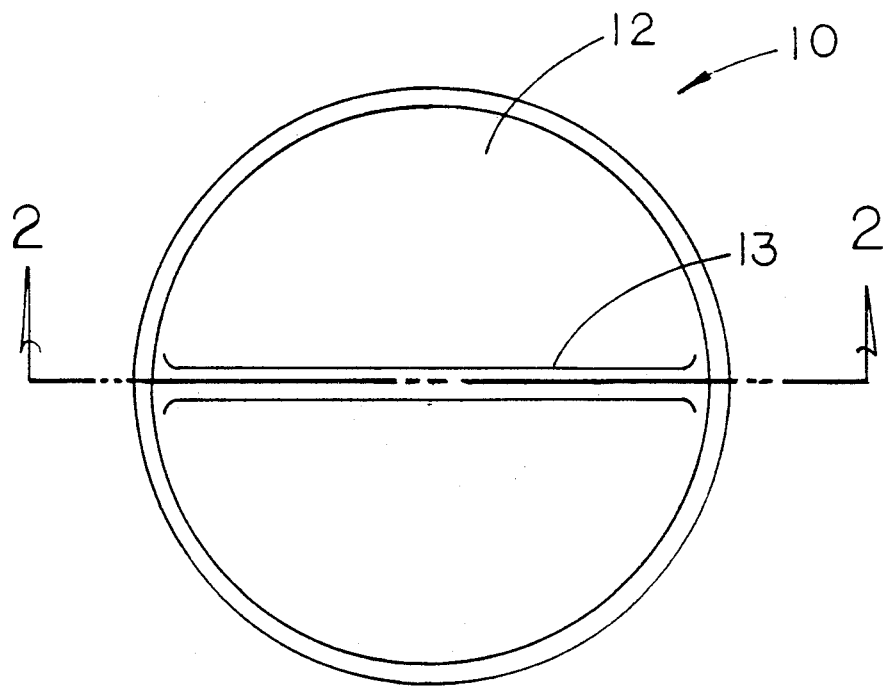
FIG. 1 is a top orthographic view of the instant invention.
Figure 2:
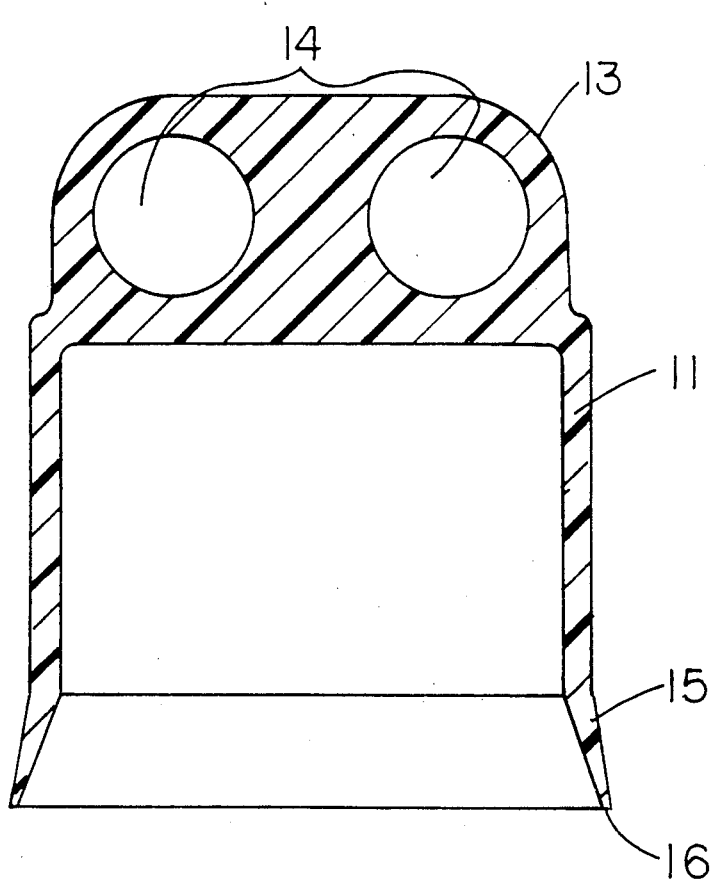
FIG. 2 is an orthographic view, taken along the lines 2—2 of FIG. 1 in the direction indicated by the arrows.

With reference now to the drawings, and in particular to FIGS. 1 to 9 thereof, a new and improved ice scraper apparatus embodying the principles and concepts of the present invention and generally designated by the reference numerals 10, 10a, 10b, and 10c will be described.

More specifically, the ice scraper apparatus 10 of the instant invention essentially comprises a cylindrical housing 11, including a housing top wall 12 orthogonally oriented relative to a housing axis of the housing 11. The top wall 12 includes a top wall flange 13 medially receiving the housing axis therethrough, with the flange orthogonally oriented relative to the top wall 12. A plurality of flange openings 14 are directed through the flange for receiving finger portions of an individual for ease of manual grasping of the structure in use. The cylindrical housing 11 includes a conical housing lower skirt 15 projecting exteriorly of the cylindrical housing 11 terminating in a circular scraping edge 16 at the lower distal end of the conical housing 15, as the circular cutting edge is in a coplanar orientation within a plane orthogonally oriented relative to the housing axis of the housing 11.

The apparatus 10a, as illustrated in the FIG. 3, includes a coaxially oriented externally threaded boss 17 orthogonally mounted to the top wall 12 projecting upwardly thereof to receive a torroidal mounting ring 19 and project through a mounting ring central bore 20 of the mounting ring 19. A handle leg 18 fixedly mounted to the mounting ring 19 projects exteriorly of the mounting ring. A diametrically aligned groove 21 formed within a bottom surface of the mounting ring 19 bisected by the central bore 20 is arranged to receive a plurality of diametrically aligned ribs 22 fixedly mounted to the top wall 12, wherein the ribs 22 are diametrically directed along the top wall interior surface thereof. A fastener cup 23 is arranged to capture the mounting rings 19 therebelow, as the fastener cap 23 includes a cap bottom wall 24 formed with a bottom wall internally threaded bore 25 arranged for reception of the externally threaded boss 17 therethrough. In this manner, an integral construction is provided permitting removal of the handle 18 for use of the cylindrical housing 11 independently of the handle 18 as required and permitting replacement of the cylindrical housing 11 as required.

The apparatus 10b, as illustrated in the FIGS. 5 and 6, includes the cylindrical housing top wall 12 formed with a rectilinear bore 28 directed therethrough receiving a rectangular base 27 of an externally threaded boss 26 mounted to a bottom surface of the cap structure 23 mounted to the handle 18. A fastener 29 positioned against the bottom surface of the top wall secures the cap 23 to the housing 11.

The apparatus 10c, as set forth in the FIGS. 7-9, includes an illumination housing 33 mounted to the top wall 12, with the housing 33 pivotally mounted about a pivot axle 33a to the handle 18. A switch 30 mounted within the handle 18 effects selective illumination of illumination bulb 32 mounted within the illumination housing and cooperative with a battery 31 positioned within the handle. A transparent lens 34 is mounted to the illumination housing 33 adjacent a forward end thereof and positioned below a housing flange 36 projecting forwardly of the transparent lens 34. A mirror 35 is mounted to a bottom surface of the flange 36 intersecting orthogonally the transparent lens 34 to provide downward reflection as the mirror 35 extends beyond the cylindrical housing side wall 11 to provide for downward illumination. The pivoted transparent housing 33 further permits reorientation of the illumination housing 33 about the axle 33a to provide for repositioning of illumination to accommodate various vehicular windshields during an ice scraping procedure.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An ice scraper apparatus, comprising,
   a cylindrical housing, the cylindrical housing defined about a housing axis, and a top wall fixedly mounted to an upper distal end of the cylindrical housing orthogonally oriented relative to the housing axis, and
   the cylindrical housing including a conical housing lower skirt portion extending exteriorly of the cylindrical housing and coaxially oriented about the housing axis, and
   the skirt including a circular scraping edge positioned within a predetermined plane, the predetermined plane oriented orthogonally relative to the housing axis and the circular scraping edge defining a lower edge of the lower skirt, and
   the top wall has attached thereto grasping means projecting above the top wall for manual grasping in ease of maneuverability of the cylindrical housing, and
   the grasping means includes a handle member fixedly mounted to the top wall, the handle member including an illumination housing pivotally mounted to a forward distal end of the handle about an axle, the axle oriented parallel relative to the housing top wall, and the illumination housing including a housing flange projecting radially beyond the cylindrical housing. and a transparent lens mounted within a forward end of the housing below the flange. and a mirror mounted in contiguous communication to the flange orthogonally intersecting the transparent lens. and a battery mounted within the handle. and a switch member mounted within the handle. and an illumination bulb mounted within the illumination housing adjacent the transparent lens. wherein the switch. the battery. and the illumination bulb are in electrical communication with one another permitting selective actuation of the illumination bulb by the switch with the mirror arranged to reflect illumination from the illumination bulb downwardly relative to the housing flange.

* * * * *